US010696030B2

(12) United States Patent
Liao et al.

(10) Patent No.: US 10,696,030 B2
(45) Date of Patent: Jun. 30, 2020

(54) HEAT-INSULATING TRANSPARENT POLYVINYL CHLORIDE SHEET HAVING EXCELLENT WEATHERABILITY AND PROCESS FOR PRODUCING THE SAME

(71) Applicant: NAN YA PLASTICS CORPORATION, Taipei (TW)

(72) Inventors: Te-Chao Liao, Taipei (TW); Ying-Te Huang, Taipei (TW); Chen-Ho Lai, Taipei (TW); Chao-Hsien Lin, Taipei (TW); Ching-Yao Yuan, Taipei (TW); Teng-Ko Ma, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 0 days.

(21) Appl. No.: 16/409,198

(22) Filed: May 10, 2019

(65) Prior Publication Data
US 2019/0330462 A1  Oct. 31, 2019

Related U.S. Application Data

(63) Continuation-in-part of application No. 15/682,612, filed on Aug. 22, 2017, now abandoned.

(30) Foreign Application Priority Data

Aug. 25, 2016  (TW) .............................. 105127201 A

(51) Int. Cl.

| | | |
|---|---|---|
| C08L 27/06 | (2006.01) | |
| B32B 27/30 | (2006.01) | |
| C08K 5/12 | (2006.01) | |
| C01G 41/00 | (2006.01) | |
| C08K 5/098 | (2006.01) | |
| C08K 3/11 | (2018.01) | |
| C01D 17/00 | (2006.01) | |
| C08J 5/18 | (2006.01) | |
| C08K 5/1515 | (2006.01) | |
| C08K 3/105 | (2018.01) | |
| B29C 49/00 | (2006.01) | |
| B29C 49/48 | (2006.01) | |
| C08K 3/30 | (2006.01) | |
| C08K 3/34 | (2006.01) | |
| C08K 5/02 | (2006.01) | |
| C08K 5/103 | (2006.01) | |
| C08K 5/54 | (2006.01) | |
| C08K 5/56 | (2006.01) | |
| C08F 14/06 | (2006.01) | |
| C08K 5/00 | (2006.01) | |
| B29K 27/06 | (2006.01) | |
| C08K 3/32 | (2006.01) | |

(52) U.S. Cl.
CPC ........ *B32B 27/304* (2013.01); *B29C 49/0047* (2013.01); *B29C 49/4823* (2013.01); *C01D 17/00* (2013.01); *C01D 17/003* (2013.01); *C01G 41/006* (2013.01); *C08F 14/06* (2013.01); *C08J 5/18* (2013.01); *C08K 3/105* (2018.01); *C08K 3/11* (2018.01); *C08K 3/30* (2013.01); *C08K 3/34* (2013.01); *C08K 5/005* (2013.01); *C08K 5/0016* (2013.01); *C08K 5/02* (2013.01); *C08K 5/098* (2013.01); *C08K 5/103* (2013.01); *C08K 5/12* (2013.01); *C08K 5/1515* (2013.01); *C08K 5/54* (2013.01); *C08K 5/56* (2013.01); *C08L 27/06* (2013.01); *B29C 2049/001* (2013.01); *B29C 2049/4828* (2013.01); *B29K 2027/06* (2013.01); *B29K 2995/0015* (2013.01); *B29K 2995/0026* (2013.01); *C08J 2327/06* (2013.01); *C08K 2003/324* (2013.01); *C08K 2201/005* (2013.01)

(58) Field of Classification Search
CPC .......... C08L 27/06; C08K 3/105; C08K 3/30; C08K 3/34; C08K 5/02; C08K 5/103; C08K 5/54; C08K 5/56; C08K 2003/324; C08K 2201/005; B29C 49/0047; B29C 49/4823; B29C 2049/001; B29C 2049/4828; B29K 2027/06; B29K 2995/0015; B29K 2995/0026
USPC ........................................................ 524/567
See application file for complete search history.

(56) References Cited

FOREIGN PATENT DOCUMENTS

| | | | |
|---|---|---|---|
| CN | 101289561 | * | 10/2008 |
| JP | 2006176621 A | * | 7/2006 |

OTHER PUBLICATIONS

Translation of JP 2006-176621 (Patent application 2004-370722), Jul. 6, 2006. (Year: 2006).*
Translation of CN 101289561, Oct. 22, 2008. (Year: 2008).*

* cited by examiner

*Primary Examiner* — Hui H Chin
(74) *Attorney, Agent, or Firm* — Li & Cai Intellectual Property (USA) Office

(57) ABSTRACT

A heat-insulating transparent PVC sheet is formed from a PVC substrate having a thickness of 0.02-2.0 mm and contains heat-insulation pastes evenly distributed over the PVC substrate, since the heat-insulation paste contains an essential component of wolfram cesium powder (WCs) with a chemical formula of $Cs_xN_yWO_{3-Z}Cl_C$ and having a particle size of 0.005-2 μm, the heat-insulating transparent PVC sheet has an excellent weatherability, and particularly before and after tested in 300-hour service life in line with ASTM G-154 specification, has a physical property of weatherability decay rate (%) small than 4%.

11 Claims, 2 Drawing Sheets

HEAT-INSULATING TRANSPARENT POLYVINYL CHLORIDE SHEET HAVING EXCELLENT WEATHERABILITY AND PROCESS FOR PRODUCING THE SAME

CROSS-REFERENCE TO RELATED PATENT APPLICATION

This application claims the benefit of priority to Taiwan Patent Application No. 105127201, filed on Aug. 25, 2016. The entire content of the above identified application is incorporated herein by reference.

This application claims priority from the U.S. patent application Ser. No. 15/682,612 filed Aug. 22, 2017, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE INVENTION

1. Field of the Invention

The present invention relates to a weatherable heat-insulating transparent polyvinyl chloride sheet (hereinafter referred to as weatherable PVC sheet) and a process for producing the same. More particularly, the weatherable PVC sheet possesses a long-term service life to keep more excellent in visible light transmittance property as well as infra-red-blocking property than prior arts.

2. Description of Related Art

Heat-insulating transparent sheets themselves for use in being covered to building glasses, car windows or showcase freezers to transmit visible light and block infrared (IR) as well as ultraviolet (UV) are required to have physical properties excellent in not only visual transparency, but also infrared and ultraviolet cutting-off effect.

To satisfy those requirements of having heat-insulating capacity to block infrared wavelength ranged from 700 nm to 1800 nm as well as having visual transparency to allow visible light in wavelength ranged from 400 nm to 700 nm to transmit through, some applicable materials such as polyvinyl chloride (PVC) are specifically selected to produce those so-called heat-insulating transparent polyvinyl chloride sheets (hereinafter referred to as PVC sheet). In addition, when a PVC sheet is used to cover onto building glass and car windows, the PVC sheet must further have UV-shielding capacity to protect human body from UV sunburn because ultraviolet in wavelength ranged from 200 nm to 400 nm in sunlight can cause a certain level of damage to human body.

The conventional processes for producing the aforesaid PVC sheet include a dry-coating process and a wet-coating process, but the produced PVC sheet in practical application subject to physical properties decayed quickly has a shorter service life.

As shown in FIG. 1, a PVC sheet 10 made by the dry-coating process has a metal, metallic oxide or inorganic material 12 uniformly attached on a plastic substrate 11 by a vacuum sputtering or evaporating process as a heat-insulating layer.

As shown in FIG. 2, another PVC sheet 20 made by the wet-coating process, heat-insulating inorganic particles 22 are distributed uniformly in an appropriate resin 23 and solvent to form a coating liquid with appropriate viscosity for coating on a plastic substrate 21. After drying to remove the solvent, the inorganic particles 22 and the resin 23 become a heat-insulating layer attached on the plastic substrate 21.

More specially, the conventional method for making the aforesaid PVC sheet is complicatedly composed of at least two procedures. The first procedure is to prepare a matrix membrane (or called substrate) and then the second procedure is to apply or deposit infrared-blocking or ultraviolet-shielding material onto the matrix membrane surface.

Issues raised from the prior-art method include environmental problems such as air pollution caused by volatile solvents and disposal of waste solvents, as well as high costs for process equipment and processing. Besides, while antimony tin oxide (ATO), antimony zinc oxide (AZO), and other metal oxides and hexaborides like lanthanum hexaboride ($LaB_6$), and cerium hexaboride ($CeB_6$) are all capable of heat-insulation and have used for making heat-insulating transparent polyvinyl chloride sheet, their heat-insulation effect can soon decay because of their inferior weatherability.

Particularly, a transparent heat-shielding film itself if formed from prior conventional method is irradiated with an accelerated weathering tester to perform a 300-hour service life test (or called QUV300 hr weatherability test) in line with ASTM G-154 specifications, resulted in that a physical property of regarding a sum of a visible light transmittance (VLT %) plus an infrared cut rate (IR cut %) of the transparent heat-shielding film itself is subject to decay at least 10 percentage (i.e., 10%). Accordingly, it is meant that the transparent heat-shielding film formed from prior conventional method is so inferior in weatherability.

SUMMARY OF THE INVENTION

In one aspect, the present invention provides a weatherable heat-insulating transparent polyvinyl chloride sheet having a thickness of ranging from 0.02 mm to 2.0 mm and possesses an excellent weatherability in respect of a visible light transmittance as well as infrared cut rate (IR cut %), and particualry, if performed a test in 300-hour service life in line with ASTM G-154 specification, having a physical property of regarding a sum of a visible light transmittance (VLT %) plus an infrared cut rate (IR cut %) of the sheet decayed smaller than five percentage.

More specially, as compared to the conventional heat-insulation sheet made of metal oxides, the invented weatherable PVC sheet of the present invention has better retention of heat insulation effects, slower decay, and superior light transmittance as well as infrared shielding ability.

The present invention further provides a weatherable PVC sheet formed from a PVC mixture including (a) 100 PHR (parts per hundred resin) of a polyvinyl chloride resin; (b) 0.1-60 PHR of a plasticizer; (c) 1-10 PHR of epoxidized soybean oil (ESBO); (d) 0.1-10 PHR of a stabilizer; (e) 0.05-5.0 PHR of an ultraviolet absorber; (0.05-0.2 PHR of a coupling agent; and (g) 5.5-7.5 PHR of a heat-insulation paste.

The present invention features the composition (g) of heat-insulation paste of the PVC mixture for use in making the weatherable PVC sheet is made by preparing a mixture of a heat-insulation wolfram cesium powder (WCs), a dispersant and a plasticizer, and being ground to a nano-sized particle ranged from 40 nm to 110 nm. Particularly, heat-insulation paste of the PVC mixture has the following composition made to 100 wt %:

g1) 10-18 wt % of the wolfram cesium powder (WCs);
g2) 2-5 wt % of the dispersant, preferably polymeric copolymer dispersants; and
g2) 77-88 wt % of the plasticizer, preferably 1,2-cyclohexanedicarboxylic acid diisononyl ester (DHIN).

The present invention further features the wolfram cesium powder (WCs) of the heat-insulation paste of the PVC mixture has a particle size ranged from 0.005 µm to 2 µm, and is a kind of composite tungsten oxychloride powder with a chemical formula of $Cs_XN_YWO_{3-Z}Cl_C$, where Cs is cesium; N is tin (Sn) or antimony (Sb) or bismuth (Bi); W is wolfram; O is oxygen; and X, Y, Z, C are all positive numbers, with the following relationship satisfied:

$X \leq 1.0$; $Y \leq 1.0$; $Y/X \leq 1.0$; $Z \leq 0.6$; and $C \leq 0.1$.

In one aspect, the present disclosure provides a heat-insulating transparent polyvinyl chloride sheet, having a thickness of ranging from 0.02 mm to 2.0 mm, before and after tested in 300-hour service life in line with ASTM G-154 specification, having a physical property of weatherability decay rate (%) small than 4%, and formed from a PVC mixture including (a) 100 PHR of a polyvinyl chloride resin; (b) 0.1-60 PHR of a plasticizer; (c) 1-10 PHR of epoxidized soybean oil; (d) 0.1-10 PHR of a stabilizer; (e) 0.05-5.0 PHR of an ultraviolet absorber; (0.05-0.2 PHR of a coupling agent; and (g) 5.5-7.5 PHR of a heat-insulation paste; (h) 0.05-0.5 PHR of a light conversion agent; and (i) 0.01-1 PHR of an antifogging agent.

The present invention further provides a process for producing the weatherable PVC sheet to allow the aforesaid PVC mixture, after undergone a calendering process by a calendar, or undergone a T-Die process by a T-Die machine, or undergone a blow-molding process by a blow-molding machine, to become the weatherable PVC sheet, which possesses an excellent weatherability in respect of a visible light transmittance as well as infrared cut rate (IR cut %), and particualry, if performed a test in 300-hour service life in line with ASTM G-154 specification, having a physical property of regarding a sum of a visible light transmittance (VLT %) plus an infrared cut rate (IR cut %) of the sheet decayed smaller than five percentage.

The produced weatherable PVC sheet of the present invention itself due to having the inventive heat-insulation paste evenly distributed over the PVC sheet has a self-adhesive capacity so it is suitable for family use. When made into commercially products, the weatherable PVC sheet may provide different levels of heat insulation and transmittance, and is suitable for various applications, such as building glass, car windows and showcase freezers, ect. It is also ideal for family do it yourself (DIY), industrial use and other applications where energy conservation is a concern.

The weatherable PVC sheet of the present invention in practical application has following advantages:
1. to have special heat-insulation paste filled in the weatherable PVC sheet to help the sheet to have high transparency as well as high heat insulation;
2. to have good weatherability and long-lasting heat insulation with less decay in terms of heat insulation;
3. to have self-adhesive capacity so suitable for users' self-assembly applications;
4. to have the weatherable PVC sheet excellent in physical properties including retaining good transparency, low haze, preferable heat insulation and preferable resistance to friction of polyvinyl chloride sheet; and
5. to overcome the problem of processing precipitation while producing the weatherable PVC sheet of the present invention.

Furthermore, the effects of the present invention reside in that the heat-insulating transparent polyvinyl chloride sheet including the technical features of "(g) 5.5-7.5 PHR of a heat-insulation paste; (h) 0.05-0.5 PHR of a light conversion agent" and "(i) 0.01-1 PHR of an antifogging agent" not only can provide the UV-blocking and IR-infared light-insulating effects, but also convert the blue light of sunlight into a red light, which can be applied to agricultural films (for example a tunnel-type shed film, a sunshade film and a shading net in greenhouse). In addition, the heat-insulating transparent polyvinyl chloride sheet reduces heat barriers in the greenhouse, which is conducive to harvesting operations and crop growth, further increases photosynthesis intensity of plants and promote plant development.

Furthermore, the agricultural film keeps the humidity and temperature of the greenhouse higher than outside, such that the steam would condense on the surface of the agricultural film, and affect the light transmission. Therefore, the antifogging agent maintains the light transmission of the heat-insulating transparent polyvinyl chloride sheet, and good for plant growth.

DETAILED DESCRIPTION OF THE INVENTION

First Embodiment

Figure 1:
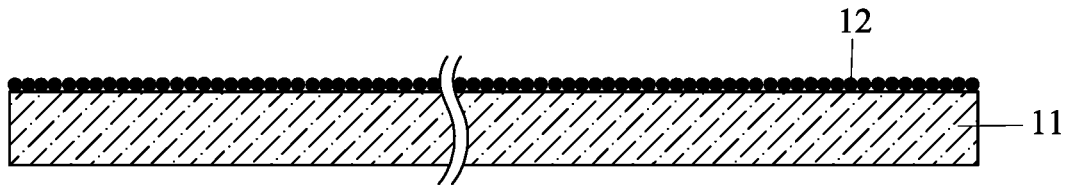
FIG. 1 is a cross-sectional enlarged view of a heat-insulating transparent sheet produced by a conventional dry-coating process.
Figure 2:
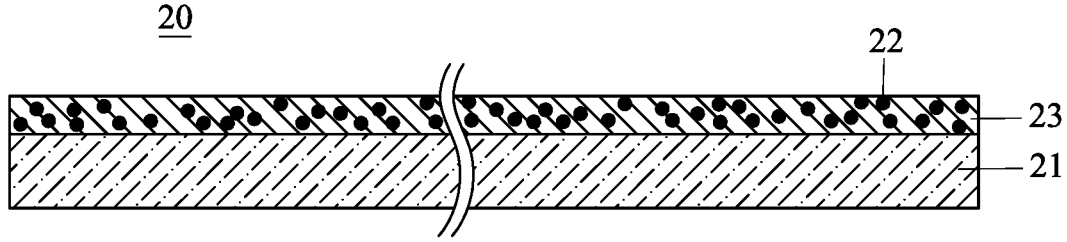
FIG. 2 is a cross-sectional enlarged view of a heat-insulating transparent sheet produced by a conventional wet-coating process.
Figure 3:
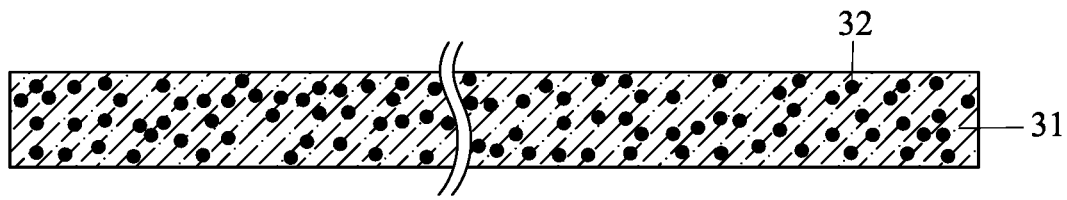
FIG. 3 is a cross-sectional enlarged view of a weatherable PVC sheet of a first embodiment of the present invention produced by a disclosed process of the present invention.

As shown in FIG. 3, a weatherable heat-insulating transparent polyvinyl chloride sheet (or abbreviated as weatherable PVC sheet) 30 of the present invention is a soft, semi-hard or hard sheet having a thickness of ranging from 0.02 mm to 2.0 mm and contains a PVC substrate 31 having heat-insulation pastes 32 evenly distributed over the PVC substrate 31.

The weatherable PVC sheet 30 is formed from a PVC mixture including (a) 100 PHR of a polyvinyl chloride resin; (b) 0.1-60 PHR of a plasticizer; (c) 1-10 PHR of epoxidized soybean oil (ESBO); (d) 0.1-10 PHR of a stabilizer; (e)

0.05-5.0 PHR of an ultraviolet absorber; (0.05-0.2 PHR of a coupling agent; and (g) 5.5-7.5 PHR of the heat-insulation paste 32.

The heat-insulation paste 32 of the PVC mixture of the present invention, being ground to have a nano-sized particle ranged from 40 nm to 110 nm, is prepared by a mixture having the following composition made to 100 wt %:

g1) 10-18 wt % of a wolfram cesium powder (WCs);
g2) 2-5 wt % of a dispersant, preferably polymeric co-polymer dispersants; and
g3) 77-88 wt % of a plasticizer, preferably 1,2-cyclohexanedicarboxylic acid diisononyl ester (DHIN).

The wolfram cesium powder (WCs) of the heat-insulation paste 32, having a particle size ranged from 0.005 μm to 2 μm, is a kind of composite tungsten oxychloride powder with a chemical formula of $Cs_XN_YWO_{3-Z}Cl_C$, where Cs is cesium; N is tin (Sn) or antimony (Sb) or bismuth (Bi); W is wolfram; O is oxygen; and X, Y, Z, C are all positive numbers, with the following relationship satisfied:

$$X \le 1.0; \ Y \le 1.0; \ Y/X \le 1.0; \ Z \le 0.6; \text{ and } C \le 0.1.$$

The aforesaid dispersant may be one or more selected from polymeric co-polymer dispersants, silicon-containing dispersants, and fluorine-containing dispersants. The dispersant serves to have the heat-insulation paste 32 evenly distributed over the weatherable PVC sheet 30 of the present invention.

To grind the heat-insulation paste 32 of the present invention sized in nano-sized particle ranged from 40 nm to 110 nm is performed with yttrium-zirconium beads. And, a mixture of the heat-insulation paste 32 of the present invention is prepared by having 10-18 wt % of wolfram cesium powder (WCs) added into 77-88 wt % of the plasticizer of DHIN, and 2-5 wt % of a polymeric dispersant is added. For dispersing the mixture of the heat-insulation paste 32, a process for grinding the mixture with yttrium-zirconium beads is performed to obtain a dispersed heat-insulation paste 32 with a particle size ranged from 40 nm to 110 nm. The particle size of the dispersed heat-insulation paste 32 is determined by the following two grinding conditions:

(I) perform a single-stage grinding (i.e., coarse grinding): the resulting particle size of the dispersed heat-insulation paste 32 having an average particle size ranged about from 90 nm to 110 nm.

Single-stage grinding parameters include grinding beads of 0.2-0.6 mm in diameter being used; medium filling rate of 80-95%; sieving size of 15-100 μm; grinding temperature below 50° C. and grinding time of 6-12 hours.

(II) perform a two-stage grinding (including coarse grinding and fine grinding): the resulting particle size of the dispersed heat-insulation paste 32 having an average particle size ranged about from 40 nm to 60 nm.

1. in coarse grinding stage, performed with parameters identical to those for the foregoing "single-stage grinding parameters".
2. in fine grinding stage, perform a fine grinding parameters include grinding beads of 0.05-0.2 mm in diameter being used; medium filling rate of 80-95%; sieving size of 15-100 μm; grinding temperature below 50° C. and grinding time of 4-8 hours.

A process for producing the disclosed weatherable PVC sheet 30 of the present invention comprises the following steps:

a) mixing a polyvinyl chloride resin of 100 PHR, a plasticizer of 0.1-60 PHR, epoxidized soybean oil of 1-10 PHR, a stabilizer of 0.1-10 PHR, an ultraviolet absorber of 0.05-5.0 PHR, a coupling agent of 0.05-0.2 PHR, and the aforesaid heat-insulation paste 32 of 5.5-7.5 PHR well into a mixture using a mixer, and introducing the mixture into a banbury mixer for kneading;

b) controlling the mixture temperature at 150-190° C., heating and shearing the mixture in a roller machine for well-gelation, and proceeding one of the following processes:

b1) calendering the mixture by a calendar to form a heat-melting sheet having a thickness of 0.05 mm-1.0 mm, drawing water at 20~85° C. therein for cooling to improve the transparency of the PVC sheet after forming, and then entering step c) after dehydration;

b2) processing the mixture by a T-Die machine to form a heat-melting sheet of thickness of 0.05-2.0 mm, and then entering step c) after forming; or b3) processing the mixture by a blow-molding machine to form a heat-melting sheet of thickness of 0.02-0.8 mm, and then entering step c) after forming; and c) introducing the sheet into a cooling wheel for cooling and shaping, and then rolling up the sheet to realize the weatherable PVC sheet 30 of the present invention.

In step a), the polyvinyl chloride (PVC) resin can be one or a composition of more than one of a PVC polymer or copolymer made by bulk polymerization, solution polymerization, suspension polymerization or emulsion polymerization.

The plasticizer used in step a) of the process for producing the weatherable PVC sheet 30 is one or more selected from plasticizers based on phosphates, phthalates, trimellitates, epoxides, polyesters, chlorinated hydrocarbons and aliphatic dicarboxylic esters.

Therein, the phthalate-based plasticizer is preferably one or more selected from C9-C11 dialkyl phthalate (commercially available from 911P made by Nan Ya Plastic Corporation, Taiwan), di-isononyl phthalate (DINP), di-2-ethylhexyl phthalate (DEHP), di-butyl phthalate (DBP), di-isodecyl phthalate (DIDP) or di-2-ethylhexyl terePhthalate (DOTP).

The aliphatic dicarboxylic ester-based plasticizer is one or more selected from di-isononyl adipate (DINA) or dioctyl adipate (DOA).

The trimellitate-based is preferably one or more selected from tris (2-ethylhexyl) trimellitate (TOTM).

The polyester-based plasticizer is one or more selected from 1,2-cyclohexanedicarboxylic acid diisononyl ester (DHIN) and bis(2-ethylhexyl) cyclohexane-1,2-dicarboxylate (DHEH).

The heat-insulation paste 32 containing nano-sized composite tungsten oxychlorides of 0.005-2 μm used in step a) has a particle size of 40 nm-110 nm, and the particle size of the heat-insulation paste 32 depends on practical needs for various physical properties such as transparency and haze.

In step a), the stabilizer used may be one or more composite stabilizers selected from Ba—Zn stabilizers, Ca—Zn stabilizers and organic tin stabilizers.

In step a), an auxiliary may be added and selected from one or more of modifiers, dispersants, and ultraviolet absorbers. The additive auxiliary agent serves to evenly distribute the heat-insulation paste 32 of the present invention over in the PVC substrate 31 of the weatherable PVC sheet 30.

Therein, in step a), the coupling agent may be one or more of an organic silane compound coupling agent, an organic Zr—Al compound coupling agent and organic titanium aluminide, which is favorable to processing and prevents precipitation.

In step a), the ultraviolet (UV) absorber may be one or more selected from a hydroxy-phenyl benzotriazole ultraviolet absorber, and a hydroxybenzophenone ultraviolet absorber.

In practical applications, the disclosed weatherable PVC sheet 30 of the present invention may be used with one layer or may be stacked into a multi-layered structure for increased thickness to replace glass.

Figure 4:
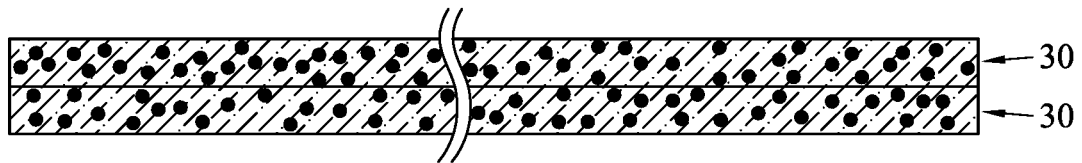
FIG. 4 is a schematic view showing that two layers of the weatherable PVC sheet of FIG. 3 are stacked together as a multi-layered weatherable PVC sheet for use.
Figure 5:
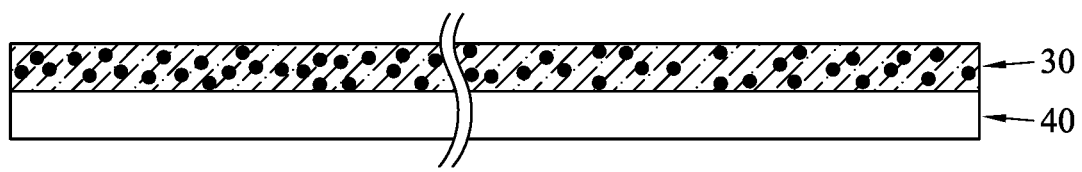
FIG. 5 is a schematic view showing that one layer of the weatherable PVC sheet of FIG. 3 is laminated with other plastic matrix together as a complex-layered weatherable PVC sheet for use.
Figure 6:
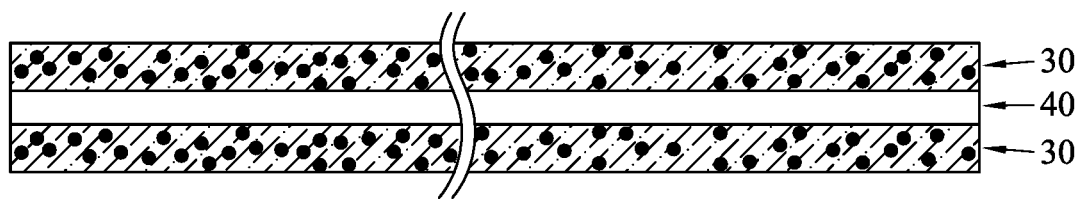
FIG. 6 is a schematic view showing that a plastic matrix is interleaved into two layers of the weatherable PVC sheets of FIG. 3 together for use.

As shown in FIG. 4, a multi-layered weatherable PVC sheet 40 of the present invention is formed from two layers of the weatherable PVC sheet 30 stacked together for use. Alternatively, as shown in FIG. 5, a complex-layered weatherable PVC sheet 50 of the invention is formed from laminating one layer of the weatherable PVC sheet 30 with other plastic matrix 40 together for use. Or, as shown in FIG. 6, another complex-layered weatherable PVC sheet 60 of the present invention is formed from interleaving one layer of plastic matrix 40 into two layers of the weatherable PVC sheet 30 of the present invention together for use.

As compared to the conventional heat-insulation PVC sheet, the weatherable PVC sheet 30 produced from the aforesaid process of the present invention possesses an excellent weatherability in respect of a visible light transmittance as well as infrared cut rate (IR cut %), and particularly, if performed a test in 300-hour service life in line with ASTM G-154 specification, having a physical property of regarding a weatherability decay rate (%), which is defined from the difference ratio in percentage of VLT % plus IR cut % (i.e., VLT %+IR cut %) before and after the test, is decayed smaller than five percentage (i.e., 5%).

The physical properties of a PVC sheet of the present invention are evaluated by the following tests.
1. Visible light transmittance (VLT %) and haze test:
The transmittance and the haze of a PVC sheet are tested with the TC-H III Haze Meter produced by Tokyo Denshoku Co., Ltd. of Japan, and the test is conducted according to the JIS K7705 testing standard.

The higher the visible light transmittance (VLT %), and the lower of haze, the more transparent the PVC sheet.
2. Infrared cut rate (IR cut %) test:
The infrared cut rate of a PVC sheet is tested with the LT-3000 infrared cut rate tester produced by HOYA of Japan, and the test is conducted according to the JIS R3106 testing standard.

The higher the infrared cut rate, the more effective the PVC sheet is in thermal insulation.
3. Ultraviolet cut rate (UV cut %) test:
The ultraviolet cut rate of a PVC sheet is tested with the LT-3000 infrared cut rate tester produced by HOYA of Japan, and the test is conducted according to the JIS R3106 testing standard.

The higher the ultraviolet cut rate, the lower UV transmittance of the PVC sheet and the better UV cutting-off effect of the PVC sheet.
4. The combined index for transparency and thermal insulation is obtained by summing up the test results of the above two tests (i.e., VLT %+IR cut %). A higher combined index means the PVC sheet have a better overall performance in transparency and thermal insulation.
5. 300-hour service life test (or called QUV300 hr weatherability test) determined in line with ASTM G-154:
In a 300-hour service life test, a QUV weathering testing machine (in line with ASTM G-154 specifications) was modeled ATLAS UV TEST from ATLAS TECHNOLOGY Co., Taiwan, and every 100 hours a film is taken out and subjected to the visible light transmittance (VLT %) test and the infrared cut rate (IR cut %) test.

The 300-hour service life test (or QUV300 hr weatherability test) is performed to a specimen of PVC sheet with the following parameters:

a) Lamp Wavelength: by using UV-B lamp to emit a spectrum of ultraviolet light with wavelengths of 313 nm
b) Ultraviolet (UV) Temperature: 50-60° C.;
c) Irradiation Cycle: 4 hours of irradiation followed by 4 hours of wet steaming each cycle;
d) Test time: 300 hours; and
f) Irradiation Energy: 0.71 w/m$^2$.

After the 300 hours of QUV weatherability test, the specimen of the PVC sheet received (1) a test for visible light transmission and haze, and (2) a test for infrared shielding ability, where test specimen of the PVC sheet were tested for the sum of a visible light transmittance (VLT %) plus an infrared cut rate (IR cut %) of the PVC sheet.
6. Assessment of VLT %+IR cut % after QUV300 hr weatherability test:
A weatherability decay rate (%) of the PVC sheet is defined from the difference ratio in percentage of VLT %+IR cut % before and after the test.

The smaller the weatherability decay rate (%) is, the better the sample's weatherability is, and the smaller decay in visible light transmittance (VLT %) and infrared cut rate (IR cut %) of the sample is.

Preparation of Heat-Insulation Paste WCs1-WCs6
1. Sample of WCs1:
As Table 1 shown, to prepare a solution of wolfram cesium powder, 10 parts by weight of wolfram cesium powder (WCs) was added into 88 parts by weight of a plasticizer (DHIN). Then 2 parts by weight of a polymeric dispersant was added.

The mixture was dispersed by performing a single-stage grinding of using 1 mm-yttrium-zirconium-bead with the grinding parameters including grinding beads: 0.2-0.6 mm; medium filling rate: 80-95%; sieve: 15-100 μm; temperature controlling: below 50° C.; and grinding time: 6-12 hours.

The mixture was ground to the extent that the heat-insulation paste's average particle size became 100 nm. A sample of WCs1 is obtained.
2. Sample of WCs2:
As Table 1 shown, to prepare a solution of wolfram cesium powder, 15 parts by weight of wolfram cesium powder (WCs) was added into 83 parts by weight of a plasticizer (DHIN). Then 2 parts by weight of a polymeric dispersant was added. Two-stage grinding was performed, wherein the first stage referred to as coarse grinding was performed using the same parameters of the sample of WCs1, and the second stage referred to as fine grinding was performed using the following parameters including grinding beads: 0.05-0.2 mm; medium filling rate 80-95%; sieve: 15-100 μm; temperature controlling: below 50° C.; and grinding time: 4-8 hours.

The mixture was ground to the extent that the heat-insulation paste's average particle size became 55 nm. A sample of WCs2 is obtained.
3. Sample of WCs3:
As Table 1 shown, to prepare a solution of wolfram cesium powder, 15 parts by weight of wolfram cesium powder (WCs) was added into 82 parts by weight of a plasticizer (DHIN). Then 3 parts by weight of a polymeric dispersant was added.

The mixture was dispersed by performing a single-stage grinding with the grinding parameters including grinding beads: 0.2-0.6 mm; medium filling rate: 80-95%; sieve: 15-100 nm; temperature controlling: below 50° C.; and grinding time: 6-12 hours.

The mixture was ground to the extent that the heat-insulation paste's average particle size became 100 nm. A sample of WCs3 is obtained.

4. Sample of WCs4:

As Table 1 shown, to prepare a solution of wolfram cesium powder, 15 parts by weight of wolfram cesium powder (WCs) was added into 82 parts by weight of a plasticizer (DHIN). Then 3 parts by weight of a polymeric dispersant was added. Two-stage grinding was performed, wherein the first stage referred to as coarse grinding was performed using the same parameters of the sample of WCs3, and the second stage referred to as fine grinding was performed using the following parameters including grinding beads: 0.05-0.3 mm; medium filling rate 80-95%; sieve: 15-100 μm; temperature controlling: below 50° C.; and grinding time: 4-8 hours.

The mixture was ground to the extent that the heat-insulation paste's average particle size became 55 nm. A sample of WCs4 is obtained.

5. Sample of WCs5:

As Table 1 shown, to prepare a solution of wolfram cesium powder, 15 parts by weight of wolfram cesium powder (WCs) was added into 80 parts by weight of a plasticizer (DHIN). Then 5 parts by weight of a polymeric dispersant was added.

The mixture was dispersed by performing a single-stage grinding with the grinding parameters including grinding beads: 0.2-0.6 mm; medium filling rate: 80-95%; sieve: 15-100 μm; temperature controlling: below 50° C.; and grinding time: 6-12 hours.

The mixture was ground to the extent that the heat-insulation paste's average particle size became 100 nm. A sample of WCs5 is obtained.

6. Sample of WCs6:

As Table 1 shown, to prepare a solution of wolfram cesium powder, 18 parts by weight of wolfram cesium powder (WCs) was added into 77 parts by weight of a plasticizer (DHIN). Then 5 parts by weight of a polymeric dispersant was added. Two-stage grinding was performed, wherein the first stage referred to as coarse grinding was performed using the same parameters of the sample of WCs5, and the second stage referred to as fine grinding was performed using the following parameters including grinding beads: 0.05-0.3 mm; medium filling rate 80-95%; sieve: 15-100 μm; temperature controlling: below 50° C.; and grinding time: 4-8 hours.

The mixture was ground to the extent that the heat-insulation paste's average particle size became 55 nm. A sample of WCs6 is obtained.

absorber, and 40 PHR of a plasticizer of DHIN into a mixed for well mixing, then adding 100 PHR polyvinyl chloride resin, 1 PHR of epoxidized soybean oil, 4 PHR of stabilizer and 0.1 PHR of a coupling agent, and introducing the mixture into a banbury mixer for kneading;

2) controlling the mixture at 150-190° C., gelling the mixture using a rolling mill, making the fully reacted mixture into a hot melt sheet having a thickness of 0.2 mm, and immediately introducing the sheet into cooling wheels;

3) introducing the hot melt sheet into the cooling wheel set for cooling and shape-setting, and rolling up the sheet to obtain the heat-insulating transparent polyvinyl chloride sheet with 0.2 mm thickness and 40 PHR hardness.

The produced PVC sheet is performed a 300-hour service life test in line with ASTM G-154 to, and the results are shown in Table 2.

Resulted in that the produced PVC sheet such made had good transparency, infrared shielding ability and ultraviolet rejecting ability; and no precipitation was observed in the heat-insulation paste during processing.

Assessment of VLT %+IR cut % after QUV300 hr weatherability test according to the Table 2, the difference of VLT % plus IR cut % of the produced PVC sheet before and after the test is decayed from 170% to 168%, i.e., the weatherability decay rate (%) of the produced PVC sheet is smaller than 1.2%, it means the PVC sheet itself having an excellent weatherability, after a QUV300 hr weatherability test in line with ASTM G-154.

Examples 2 and 3

Except for the heat-insulation paste was WCs2 and WCs 3, the other materials, formula and procedures for making a heat-insulating transparent polyvinyl chloride sheet were the same as those used in Example 1.

Each produced PVC sheet is performed a 300-hour service life test in line with ASTM G-154 to, and the results are shown in Table 2.

Resulted in that the produced 0.2 mm PVC sheets such made had good transparency, infrared shielding ability and ultraviolet rejecting ability; and no precipitation was observed in the heat-insulation paste during processing.

Assessment of VLT %+IR cut % after QUV300 hr weatherability test according to the Table 2, the difference of VLT % plus IR cut % of the produced PVC sheet of Examples 2

TABLE 1

| Unit: parts | | WCs1 | WCs2 | WCs3 | WCs4 | WCs5 | WCs6 |
|---|---|---|---|---|---|---|---|
| composition | wolfram cesium powder (WCs) | 10 | 15 | 15 | 15 | 15 | 18 |
| | polymeric dispersant | 2 | 2 | 3 | 3 | 5 | 5 |
| | plasticizer of DHIN | 88 | 83 | 82 | 82 | 80 | 77 |
| Single-stage or two-stage grinding | | single-stage | two-stage | single-stage | two-stage | single-stage | two-stage |
| Particle size after ground (nm) | | 100 | 55 | 100 | 55 | 100 | 55 |

Example 1

A heat-insulating transparent polyvinyl chloride sheet with 0.2 mm thickness and 40 PHR hardness was made as below:

1) by according to a specific formula of Table 2, preparing the sample of heat-insulation paste WCs1, putting 65 PHR of the heat-insulation paste WCs1, 1 PHR of an ultraviolet and 3 before and after the test is decayed from 170% to 168% and from 169% to 167% respectively, i.e., the weatherability decay rate (%) of the produced PVC sheet of the Examples 2 and 3 smaller than 1.2%, it means each the PVC sheets itself having an excellent weatherability respectively, after a QUV300 hr weatherability test in line with ASTM G-154.

Example 4 and 5

Except for the heat-insulation paste different, the other materials, formula and procedures for making heat-insulating transparent polyvinyl chloride sheets were the same as those used in Example 1. The resulting heat-insulating transparent polyvinyl chloride sheets were 0.1 mm and 0.3 mm in thickness, respectively, both with a hardness of 40 PHR.

Each produced PVC sheet is performed a 300-hour service life test in line with ASTM G-154 to, and the results are shown in Table 2.

Resulted in that the produced 0.1 mm and 0.3 mm PVC sheets such made had good transparency, infrared shielding ability and ultraviolet rejecting ability; but, they were inferior in infrared shielding ability due to reduced thickness. No precipitation was observed in the heat-insulation paste during processing.

Assessment of VLT %+IR cut % after QUV300 hr weatherability test according to the Table 2, the weatherability decay rate (%) of the produced PVC sheet of the Examples 4 and 5 is smaller than 2.4% and 1.2%, it means each the PVC sheets itself having an excellent weatherability respectively, after a QUV300 hr weatherability test in line with ASTM G-154.

Example 6

Except for the heat-insulation paste and a plasticizer DHIN up to 60 PHR, the other materials, formula and procedures for making heat-insulating transparent polyvinyl chloride sheets were the same as those used in Example 1. The heat-insulating transparent polyvinyl chloride sheet so made had a thickness of 0.5 mm and a hardness of 60 PHR.

The produced PVC sheet is performed a 300-hour service life test in line with ASTM G-154 to, and the results are shown in Table 2.

Resulted in that the produced 0.5 mm PVC sheets such made still had good transparency, and had excellent infrared shielding ability and ultraviolet rejecting ability; and no precipitation was observed in the heat-insulation paste during processing.

Assessment of VLT %+IR cut % after QUV300 hr weatherability test according to the Table 2, the weatherability decay rate (%) of the produced PVC sheet of the Example 6 is smaller than 0.6%, it means the PVC sheet itself having an excellent weatherability, after a QUV300 hr weatherability test in line with ASTM G-154.

Examples 7 and 8

Except that the using amounts of the coupling agent and the heat-insulation paste were changed, the other materials, formula and procedures for making heat-insulating transparent polyvinyl chloride sheets were the same as those used in Example 1. The heat-insulating transparent polyvinyl chloride sheet so made was 0.2 mm, 40 PHR.

Each produced PVC sheet is performed a 300-hour service life test in line with ASTM G-154 to, and the results are shown in Table 2.

Resulted in that the produced 0.2 mm PVC sheets such made had good transparency, infrared shielding ability and ultraviolet rejecting ability; and no precipitation was observed in the heat-insulation paste during processing.

Assessment of VLT %+IR cut % after QUV300 hr weatherability test according to the Table 2, the weatherability decay rate (%) of the produced PVC sheet of the Examples 7 and 8 is smaller than 1.2% and 3.6%, it means each the PVC sheets itself having an excellent weatherability respectively, after a QUV300 hr weatherability test in line with ASTM G-154.

Example 9

Except that the using amounts of the plasticizer and the stabilizer changed, the other materials, formula and procedures for making heat-insulating transparent polyvinyl chloride sheets were the same as those used in Example 1. The heat-insulating transparent polyvinyl chloride sheet so made was 0.2 mm in thickness and 0.1 PHR in hardness.

The produced PVC sheet is performed a 300-hour service life test in line with ASTM G-154 to, and the results are shown in Table 2.

Resulted in that the produced 0.2 mm PVC sheets such made still had good transparency, and had quite excellent infrared shielding ability and ultraviolet rejecting ability; and no precipitation was observed in the heat-insulation paste during processing.

Assessment of VLT %+IR cut % after QUV300 hr weatherability test according to the Table 2, the weatherability decay rate (%) of the produced PVC sheet of the Example 9 is smaller than 2.3%, it means the PVC sheet itself having an excellent weatherability, after a QUV300 hr weatherability test in line with ASTM G-154.

Example 10

Except that the plasticizer used was a combination of DHIN and DINP, each 30 PHR, and except that 0.05 PHR of an ultraviolet absorber and 2 PHR of epoxidized soybean oil are used, the other materials, formula and procedures for making heat-insulating transparent polyvinyl chloride sheets were the same as those used in Example 1. The heat-insulating transparent polyvinyl chloride sheet so made was 0.3 mm in thickness, and 60 PHR in hardness.

The produced PVC sheet is performed a 300-hour service life test in line with ASTM G-154 to, and the results are shown in Table 2.

Resulted in that the produced 0.3 mm PVC sheets such made still had good transparency, and had quite excellent infrared shielding ability and ultraviolet rejecting ability; and no precipitation was observed in the heat-insulation paste during processing.

Assessment of VLT %+IR cut % after QUV300 hr weatherability test according to the Table 2, the weatherability decay rate (%) of the produced PVC sheet of the Example 10 is smaller than 0.6%, it means the PVC sheet itself having an excellent weatherability, after a QUV300 hr weatherability test in line with ASTM G-154.

Example 11

The composition was similar to Example 6. Four layers of the 0.5 mm heat-insulation sheet of Example 6 were laminated under 180° C. and 5 kg/m² into a heat-insulating transparent polyvinyl chloride sheet having a thickness of 2.0 mm and a hardness of 60 PHR.

The produced PVC sheet is performed a 300-hour service life test in line with ASTM G-154 to, and the results are shown in Table 2.

Resulted in that the produced 2.0 mm PVC sheets such made still had good transparency, and had quite excellent infrared shielding ability and ultraviolet rejecting ability; and no precipitation was observed in the heat-insulation paste during processing.

Assessment of VLT %+IR cut % after QUV300 hr weatherability test according to the Table 2, the weatherability decay rate (%) of the produced PVC sheet of the Example 11 is smaller than 1.2%, it means the PVC sheet itself having an excellent weatherability, after a QUV300 hr weatherability test in line with ASTM G-154.

Comparative Example 1

According to a specific formula, ATO heat-insulation particles were used to make a heat-insulating transparent polyvinyl chloride sheet had a thickness of 0.3 mm and a hardness of 40 PHR.

The produced PVC sheet is performed a 300-hour service life test in line with ASTM G-154 to, and the results are shown in Table 2.

Resulted in that the produced 0.3 mm PVC sheets such made was still transparent, and had some infrared shielding ability and ultraviolet rejecting ability, but was inferior to all the examples 1-11.

Assessment of VLT %+IR cut % after QUV300 hr weatherability test according to the Table 2, the weatherability decay rate (%) of the produced PVC sheet of the Comparative Example 1 is greater than 10%, which is decayed significantly, after a QUV300 hr weatherability test in line with ASTM G-154.

Comparative Example 2

Except that the thickness was 0.2 mm, the formula of Table 2, ATO, and lanthanum hexaboride (LaB$_6$) heat-insulation particle were used to make a heat-insulating transparent polyvinyl chloride sheet having a thickness 0.2 mm and a hardness of 40 PHR.

The resulting heat-insulation polyvinyl chloride sheet was still transparent, and had infrared shielding ability and ultraviolet rejecting ability. It was better than Comparative Example 1, but inferior to all the examples. After 300 hours of Quv irradiation, its transparency and heat-insulation effect further decayed significantly.

The produced PVC sheet is performed a 300-hour service life test in line with ASTM G-154 to, and the results are shown in Table 2.

Resulted in that the produced 0.2 mm PVC sheets such made was still transparent, and had infrared shielding ability and ultraviolet rejecting ability. It was better than Comparative Example 1, but inferior to all the examples 1-11.

Assessment of VLT %+IR cut % after QUV300 hr weatherability test according to the Table 2, the weatherability decay rate (%) of the produced PVC sheet of the Comparative Example 2 is greater than 28%, which is decayed very significantly, after a QUV300 hr weatherability test in line with ASTM G-154.

Comparative Example 3

Except that no coupling agent was used, the other materials, formula and procedures the same as those used in Example 1 were used to make a heat-insulating transparent polyvinyl chloride sheet having a thickness of 0.2 mm and a hardness of 40 PHR.

The heat-insulation paste is precipitated during processing, and the final product was not stable. Accordingly, no test for physical properties was performed.

Comparative Example 4

Except that the heat-insulation paste was reduced to 4.5 PHR, the other materials, formula and procedures were the same as those used in Example 1. The resulting polyvinyl chloride transparent sheet had a thickness of 0.2 mm and a hardness of 40 PHR.

The produced PVC sheet is performed a 300-hour service life test in line with ASTM G-154 to, and the results are shown in Table 2.

Resulted in that the produced 0.2 mm PVC sheets such made was obviously reduced in its infrared shielding ability.

Assessment of VLT %+IR cut % after QUV300 hr weatherability test according to the Table 2, the weatherability decay rate (%) of the produced PVC sheet of the Comparative Example 4 is greater than 7%, which is decayed significantly, after a QUV300 hr weatherability test in line with ASTM G-154.

Comparative Example 5

Except that the heat-insulation paste was greatly increased to 8.5 PHR, the other materials, formula and procedures were the same as those used in Example 1.

After processing, since the heat-insulation paste was too much, precipitation was observed. The final product was not stable. Accordingly, no test for physical properties was performed.

TABLE 2

Processing Formula and Physical Properties of PVC sheet

| | Unit: PHR[1] | Example | | | | | | | | | | | Comparative Example | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 |
| Processing | PVC[2] | 100.0 | 100 | 100 | 100 | 100 | 100 | 100 | 100 | 100 | 100 | 100 | 100 | 100 | 100 | 100 | 100 |
| Formula | DHIN[3] | 40 | 40 | 40 | 40 | 40 | 60 | 40 | 40 | 0.1 | 30 | 60 | 40 | 40 | 40 | 40 | 40 |
| | DINP[4] | | | | | | | | | | 30 | | | | | | |
| | ESBO[5] | 1 | 2 | 2 | 2 | 2 | 2 | 2 | 2 | 10 | 2 | 2 | 2 | 2 | 2 | 2 | 2 |
| | Stabilizer | 4 | 4 | 4 | 4 | 4 | 4 | 4 | 4 | 10 | 4 | 4 | 4 | 4 | 4 | 4 | 4 |
| | UV absorber | 1 | 1 | 1 | 1 | 1 | 1 | 1 | 1 | 5 | 0.05 | 1 | 1 | 1 | 1 | 1 | 1 |
| | Coupling agent | 0.1 | 0.1 | 0.1 | 0.1 | 0.1 | 0.1 | 0.05 | 0.2 | 0.1 | 0.1 | 0.1 | 0.1 | 0.1 | — | 0.1 | 0.1 |
| heat-insulation paste | WCs1 | 6.5 | — | — | — | — | — | 5.5 | 7.5 | 6.5 | 6.5 | — | — | — | 6.5 | 4.5 | 8.5 |
| | WCs2 | — | 6.5 | — | — | — | — | | | | | | | | — | — | |
| | WCs3 | — | — | 6.5 | — | — | — | | | | | | | | — | — | |
| | WCs4 | | | | 6.5 | — | — | | | | | | | | | | |
| | WCs5 | | | | | 6.5 | — | | | | | | | | | | |
| | WCs6 | | | | | | 6.5 | | | | — | 6.5 | | | — | — | |

TABLE 2-continued

Processing Formula and Physical Properties of PVC sheet

| | Unit: PHR[1] | Example | | | | | | | | | | | Comparative Example | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 |
| Physical Properties | ATO | — | — | — | — | — | — | — | — | — | — | — | 2.2 | 1.8 | — | — | — |
| | LaB$_6$ | — | — | — | — | — | — | — | — | — | — | — | — | 0.25 | — | — | — |
| | Substrate thickness (mm) | 0.2 | 0.2 | 0.2 | 0.1 | 0.3 | 0.5 | 0.2 | 0.2 | 0.2 | 0.3 | 2.0 | 0.3 | 0.2 | 0.2 | 0.2 | 0.2 |
| | VLT (%)[6] | 75 | 75 | 75 | 80 | 74 | 73 | 79 | 75 | 77 | 72 | 70 | 58 | 69 | — | 78 | — |
| | IR cut (%)[7] | 95 | 95 | 94 | 90 | 96 | 97 | 89 | 93 | 97 | 97 | 98 | 61 | 91 | — | 62 | — |
| | VLT + IR cut (%) | 170 | 170 | 169 | 170 | 170 | 170 | 168 | 168 | 172 | 169 | 168 | 119 | 160 | — | 140 | — |
| | Haze (%) | 1.7 | 1.5 | 1.6 | 1.8 | 1.9 | 1.9 | 1.9 | 1.6 | 1.8 | 1.7 | 2.0 | 2.5 | 2.6 | — | 2.5 | — |
| | After test of QUV300 hr VLT + IR cut (%)[8] | 168 | 168 | 167 | 166 | 168 | 169 | 166 | 162 | 168 | 168 | 166 | 107 | 114 | — | 130 | — |
| | weatherability decay rate (%) | 1.2 | 1.2 | 1.2 | 2.4 | 1.2 | 0.6 | 1.2 | 3.6 | 2.3 | 0.6 | 1.2 | 10.1 | 28.8 | | 7.1 | |
| | No heat-insulation paste precipitated out | yes | yes | yes | yes | yes | yes | yes | yes | yes | yes | yes | yes | yes | no | yes | no |

Note:
[1]PHR represented parts per hundred resin.
[2]PVC is available from commercial PVC trade name of S70.
[3]DHIN represented plasticizer of 1,2-cyclohexanedicarboxylic acid diisononyl ester.
[4]DINP represented plasticizer of di-isononyl phthalate.
[5]ESBO represented epoxidized soybean oil.
[6]VLT (%) represented test of visible light transmittance to PVC sheet according to the JIS K7705 test standard.
[7]QUV300 hr represented a 300-hour service life test performed by a QUV weathering testing machine in line with ASTM G-154 test standard.

Second Embodiment

A second embodiment of the present disclosure provides a heat-insulating transparent polyvinyl chloride sheet, having a thickness of ranging from 0.02 mm to 2.0 mm, before and after tested in 300-hour service life in line with ASTM G-154 specification, having a physical property of weatherability decay rate (%) small than 4%, and formed from a PVC mixture including (a) 100 PHR of a polyvinyl chloride resin; (b) 0.1-60 PHR of a plasticizer; (c) 1-10 PHR of epoxidized soybean oil; (d) 0.1-10 PHR of a stabilizer; (e) 0.05-5.0 PHR of an ultraviolet absorber; (0.05-0.2 PHR of a coupling agent; and (g) 5.5-7.5 PHR of a heat-insulation paste; (h) 0.05-0.5 PHR of a light conversion agent; and (i) 0.01-1 PHR of an antifogging agent.

The light conversion agent is at least one selected from rare-earth element-doped alkaline earth metal aluminate, sulfur oxide, phosphate, tungstate, silicate, or organic aromatic carboxylic acid; wherein, the rare-earth element is at least one selected from Lanthanum, Samarium, Gadolinium, Yttrium and Europium. Preferably, the light conversion agent is Europium-doped yttrium oxysulfide ($Y_2O_2S$:Eu).

The antifogging agent is at least one selected from glycerol fatty acid esters, sorbitol fatty acid esters, monoglyceride or ethylene oxide adduct of sorbitan monoester. Preferably, the antifogging agent is sorbitan monostearate ($C_{24}H_{46}O_6$).

Example 12

Referring to Table 3, which shows the results of different amount of the light conversion agent in example 12 (Example A-E), the procedures for making the heat-insulating transparent polyvinyl chloride sheets were the same as those used in Example 1.

TABLE 3

| | Example | | | | | Sunlight |
|---|---|---|---|---|---|---|
| | A | B | C | D | E | |
| Light conversion agent (phr) | 0 phr | 0.05 phr | 0.1 phr | 0.2 phr | 0.5 phr | — |
| Transmittance | 77.0% | 66.1% | 62.4% | 59.2% | 58.9% | 100.0% |
| Red light % | 30.6% | 62.5% | 72.4% | 74.8% | 80.2% | 30.7% |
| Green light % | 36.0% | 18.7% | 13.6% | 12.5% | 9.4% | 35.8% |
| Blue light % | 34.1% | 19.5% | 14.5% | 13.2% | 10.8% | 34.3% |
| Red-blue light ratio | 89.8% | 321.3% | 500.0% | 565.6% | 739.6% | 89.5% |

According to table 3, Example A shows the heat-insulating transparent polyvinyl chloride sheet without the light conversion agent, and Example B-E shows different amounts of the light conversion agent. In comparison to Example A, Example B-E with the light conversion agent providing the light conversion effect. Further, the percentage of red light % increases and the percentage of blue light % decreases with the dosage of the light conversion agent.

What is claimed is:

1. A heat-insulating transparent polyvinyl chloride sheet, having a thickness of ranging from 0.02 mm to 2.0 mm, before and after tested in 300-hour service life in line with ASTM G-154 specification, having a physical property of weatherability decay rate (%) smaller than 4%, and formed from a PVC mixture including (a) 100 PHR of a polyvinyl chloride resin; (b) 0.1-60 PHR of a plasticizer; (c) 1-10 PHR of epoxidized soybean oil; (d) 0.1-10 PHR of a stabilizer; (e) 0.05-5.0 PHR of an ultraviolet absorber; (f) 0.05-0.2 PHR of a coupling agent; (g) 5.5-7.5 PHR of a heat-insulation paste; (h) 0.05-0.5 PHR of a light conversion agent; and (i) 0.01-1 PHR of an antifogging agent;
   wherein the heat-insulation paste has a particle size ranged from 40 nm to 110 nm and contains the following components summed up to 100 wt %:

(g1) a wolfram cesium powder (WCs) with a chemical formula of $Cs_XN_YWO_{3-Z}Cl_C$ of 10-18 wt %; where Cs is cesium; N is tin (Sn) or antimony (Sb) or bismuth (Bi); W is wolfram; O is oxygen; and X, Y, Z, C are all positive numbers, with the following relationship satisfied:

$$X \leq 1.0; Y \leq 1.0; Y/X \leq 1.0; Z \leq 0.6; \text{ and } C \leq 0.1;$$

(g2) a dispersant of 2-5 wt %; and
(g3) a plasticizer of 77-88 wt %;
wherein the light conversion agent is europium-doped yttrium oxysulfide ($Y_2O_2S:Eu$).

2. The heat-insulating transparent polyvinyl chloride sheet as claimed in claim 1, wherein the wolfram cesium powder (WCs) having a particle size ranged from 0.005 μm to 2 μm.

3. The heat-insulating transparent polyvinyl chloride sheet as claimed in claim 1, wherein the plasticizer is at least one selected from the group consisting of C9-C11 dialkyl phthalate, di-isononyl phthalate (DINP), di-2-ethylhexyl phthalate (DEHP), di-butyl phthalate (DBP), di-iso-decyl phthalate (DIDP), di-2-ethylhexyl terephthalate (DOTP), di-isononyl adipate (DINA) or dioctyl adipate (DOA), tris (2-ethylhexyl) trimellitate (TOTM) 1,2-cyclohexanedicarboxylic acid diisononyl ester (DHIN) and bis(2-ethylhexyl) cyclohexane-1,2-dicarboxylate (DHEH).

4. The heat-insulating transparent polyvinyl chloride sheet as claimed in claim 1, wherein the stabilizer is at least one selected from Ba—Zn stabilizers, Ca—Zn stabilizers or organic tin stabilizers.

5. The heat-insulating transparent polyvinyl chloride sheet as claimed in claim 1, wherein the ultraviolet absorber is at least one selected from a hydroxy-phenyl benzotriazole ultraviolet absorber or a hydroxybenzophenone ultraviolet absorber.

6. The heat-insulating transparent polyvinyl chloride sheet as claimed in claim 1, wherein the coupling agent is at least one selected from an organic silane compound coupling agent, an organic Zr—Al compound coupling agent or an organic titanium aluminide.

7. The heat-insulating transparent polyvinyl chloride sheet as claimed in claim 1, wherein the dispersant is at least one selected from a polymeric co-polymer dispersant, a silicon-containing dispersant or a fluorine-containing dispersants.

8. The heat-insulating transparent polyvinyl chloride sheet as claimed in claim 1, wherein the antifogging agent is at least one selected from glycerol fatty acid esters, sorbitol fatty acid esters, monoglyceride or ethylene oxide adduct of sorbitan monoester.

9. The heat-insulating transparent polyvinyl chloride sheet as claimed in claim 1, wherein the sheet is produced by the following steps:
   a) introducing the PVC mixture into a banbury mixer for kneading;
   b) controlling the mixture temperature at 150-190° C., heating and shearing the mixture in a roller machine for well-gelation, and proceeding one of the following processes:
      b1) calendering the mixture by a calender to form a heat-melting sheet having a thickness of 0.05 mm-1.0 mm, drawing water at 20~85° C. therein for cooling, and entering step c) after dehydration;
      b2) processing the mixture by a T-Die machine to form a heat-melting sheet of thickness of 0.05-2.0 mm, and entering step c) after forming; or
      b3) processing the mixture by a blow-molding machine to form a heat-melting sheet of thickness of 0.02-0.8 mm, and entering step c) after forming; and
   c) introducing the sheet into a cooling wheel for cooling and shaping, and then rolling up the sheet to obtain the heat-insulating transparent polyvinyl chloride sheet.

10. A multi-layered heat-insulating transparent polyvinyl chloride sheet, formed from having two or more of the heat-insulating transparent polyvinyl chloride sheets of claim 1 stacked together.

11. A complex-layered heat-insulating transparent polyvinyl chloride sheet, formed from laminating one layer of the heat-insulating transparent polyvinyl chloride sheets of claim 1 with a plastic matrix together.

* * * * *